US00RE35551E

United States Patent [19]

Bruni

[11] E Patent Number: Re. 35,551

[45] Reissued Date of Patent: Jul. 8, 1997

[54] PISTON FOR ALTERNATIVE ENDOTHERMIC ENGINES CREATING OIL CUSHION LUBRICATION

[75] Inventor: Ludovico Bruni, Turin, Italy

[73] Assignee: AE Borgo SPA, Italy

[21] Appl. No.: 290,095

[22] Filed: Aug. 15, 1994

Related U.S. Patent Documents

Reissue of:

[64] Patent No.: 4,903,580
Issued: Feb. 27, 1990
Appl. No.: 218,616
Filed: Jul. 13, 1988

U.S. Applications:

[63] Continuation of Ser. No. 107,139, Aug. 17, 1993, abandoned, which is a continuation of Ser. No. 841,635, Feb. 27, 1992, abandoned, which is a continuation of Ser. No. 848,963, Apr. 7, 1986, abandoned.

[30] Foreign Application Priority Data

Apr. 12, 1985 [IT] Italy ..... 67346/85

[51] Int. Cl.[6] ..... F02F 3/00

[52] U.S. Cl. ..... 92/158; 123/193.6

[58] Field of Search ..... 92/158, 159, 174, 92/234; 123/193.6

[56] References Cited

U.S. PATENT DOCUMENTS

| | | | |
|---|---|---|---|
| 1,468,586 | 9/1923 | Weeks . | |
| 1,760,122 | 5/1930 | Drevitson | 92/158 |
| 2,381,065 | 8/1945 | Lieberherer | 92/158 X |
| 2,407,440 | 9/1946 | Osborne . | |

FOREIGN PATENT DOCUMENTS

| | | | |
|---|---|---|---|
| 437422 | 11/1926 | Germany . | |
| 961847 | 4/1957 | Germany | 92/158 |
| 2446870 | 4/1976 | Germany . | |
| 3446121 A1 | 8/1985 | Germany . | |
| 3437111 | 4/1986 | Germany . | |
| 59-203852 | 11/1984 | Japan | 123/193.6 |
| 364787 | 1/1932 | United Kingdom | 92/158 |
| 578467 | 6/1946 | United Kingdom | 92/158 |

*Primary Examiner*—Gerald A. Michalsky
*Attorney, Agent, or Firm*—Nixon & Vanderhye P.C.

[57] ABSTRACT

An improvement of pistons for alternative, endothermic four-cycle engines, in which notches or grooves are cut on opposite sides of the oval surface of the piston skirt and arranged in a parallel fashion with respect to the piston pin. The grooves create concavities which are closed off frontally by the cylinder wall and laterally by the piston skirt. The purpose of the grooves is to create a series of pockets for the lubricating oil which is under pressure during engine operation, and to improve lubrication in the areas of maximum piston stress.

15 Claims, 2 Drawing Sheets

PISTON FOR ALTERNATIVE ENDOTHERMIC ENGINES CREATING OIL CUSHION LUBRICATION

Matter enclosed in heavy brackets [ ] appears in the original patent but forms no part of this reissue specification; matter printed in italics indicates the additions made by reissue.

[This application is a continuation of Ser. No. 848,963, filed 4/7/86, now abandoned] *This reissue application is a continuation of reissue application Ser. No. 08/107,139, filed Aug. 17, 1993, now abandoned, which is a continuation of reissue application Ser. No. 07/841,635, filed Feb. 27, 1992, now abandoned, which is a reissue application of U.S. Pat. No. 4,903,580, issued Feb. 27, 1990, filed as application Ser. No. 07/218,616, filed Jul. 13, 1988, which is a continuation of application Ser. No. 06/848,963, filed Apr. 7, 1986, now abandoned.*

BACKGROUND OF THE INVENTION

1. Field of the Invention

The invention is directed to pistons for alternative, endothermic engines. Notches or grooves are cut on opposite sides of the oval surface of the piston skirt and arranged in a parallel fashion with respect to the piston pin. The grooves create concavities which are closed off frontally by the cylinder wall and laterally by the piston skirt. The purpose of these grooves is to create a series of pockets for the lubricating oil, which is under pressure during engine operation, and to improve lubrication in the areas of maximum piston stress.

2. The Prior Art

The lubrication of the pistons of internal combustion alternative engines, particularly four-cycle engines, may be insufficient in certain cases and under particular engine operating conditions. This can lead to a considerable increase in piston and engine noise in addition to seizing and scoring of the piston skirt and cylinder wall.

Different methods of improving engine lubrication by changing the angular profile of the piston are used to solve such problems.

Maximum piston stress, and therefore maximum wear, is known to be located in an area 20° on either side of a line perpendicular to the axis created by the piston pin on both sides of the piston skirt.

The purpose of the present invention is to improve lubrication in said areas, which are subject to greater pressure and wear.

SUMMARY OF THE INVENTION

The invention, on the basis of studies conducted, regards pistons for alternative, endothermic engines—particularly four-cycle engines—in which grooves or notches in those areas of the piston skirt which undergo the highest specific pressures have the purpose of holding a pre-established quantity of oil under pressure considerably improving the lubrication of the piston.

These grooves create closed concavities delimited frontally by the inner cylinder wall and laterally by the remaining parts of the piston skirt; said grooves, located on both sides of the oval piston surfaces, are arranged in a parallel fashion with respect to the piston pin.

BRIEF DESCRIPTION OF THE DRAWINGS

The invention will be described further, by way of example, with reference to the accompanying drawings, in which.

DETAILED DESCRIPTION OF THE PREFERRED EMBODIMENT

With reference to the drawings, 1 indicates the piston comprising the head 3, below which is located the skirt 2; 4 indicates the ring grooves used to hold the various rings, 5 is the axis of the piston pin, and 5a refers to the flattened faces of the piston skirt, which are 90° with respect to the piston pin.

Figure 1:
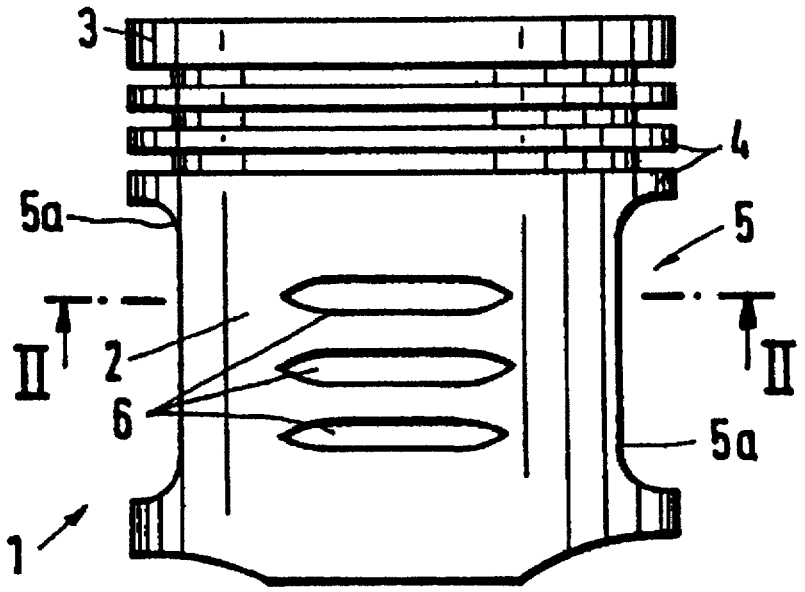
FIG. 1 shows a front view of a piston which may have any profile.

Grooves 6 having the profile illustrated in FIG. 1, and a radial depth ranging from 0.005 to around 0.05 mm, varying depending on the conventional profile which a piston should have, are created, preferentially by diamond cutting, on both sides of the piston skirt parallel to the axis 5 of the piston pin. The grooves 6 have a angular extension of approximately 50° (FIGS. 2 and 3) and are located on diametrically opposite sides of the piston (FIG. 2) parallel to the axis of the piston pin.

The number and spacing of the grooves are pre-established based on the height of the skirt 2 and points of contact of said skirt with the cylinder wall.

Figure 2:
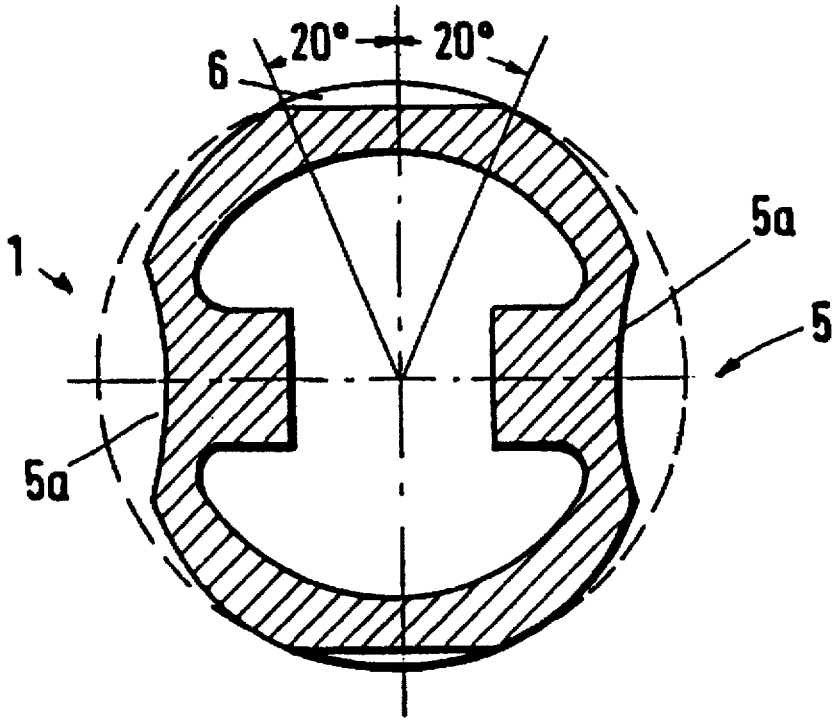
FIG. 2 is a cross-section of the same piston at line II—II of FIG. 1.
Figure 3:
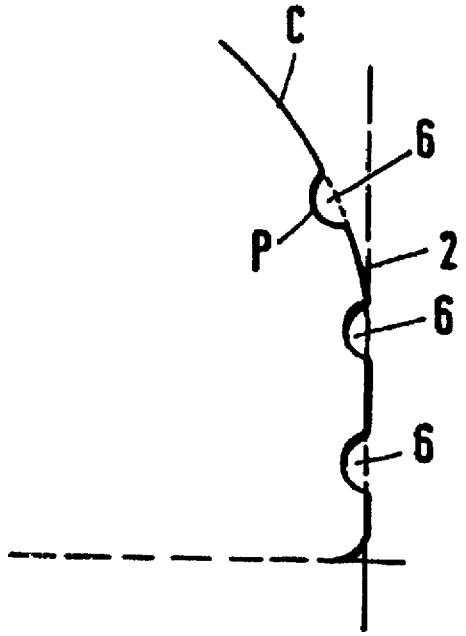
FIG. 3, on an enlarged scale, illustrates the longitudinal profile of the piston skirt.

With reference to FIG. 3, the grooves 6 are parallel and one underneath the other in the profile of the skirt C and are located on both sides of the piston 1 (FIG. 2).

Figure 4:
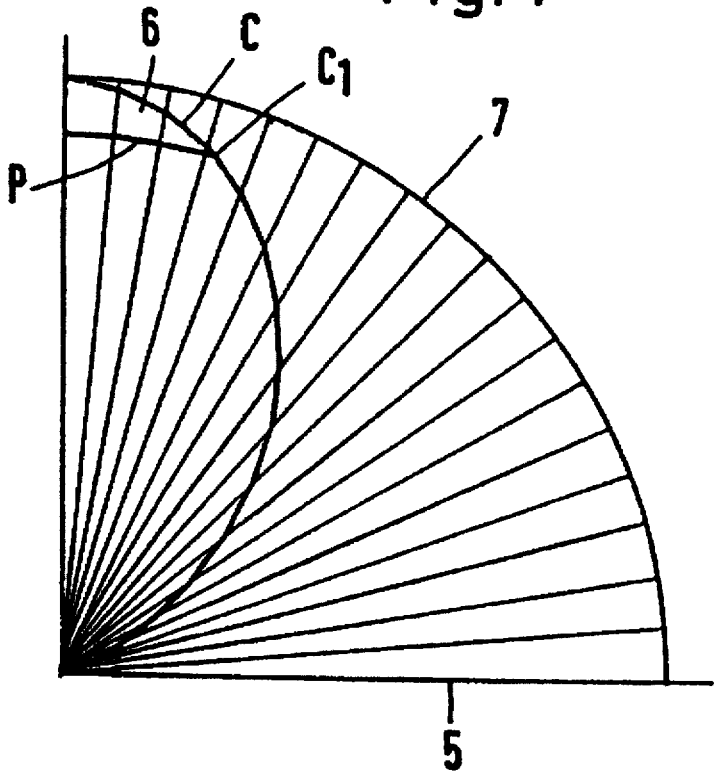
FIG. 4 is a quarter section or quadrant of the piston skirt's angular profile.

With reference to FIG. 4, which is a schematic drawing of a quadrant of an angular cross-section of the piston skirt 2 with respect to the axis of the piston pin; only part of the groove can be seen. 7 is a circle indicating the maximum piston circumference, while C indicates the true profile of the piston at the cross-sectional plane.

The transverse base of each groove 6 with respect to the skirt 2 is defined by profile P; and grooves are defined laterally, at the top, and at the bottom by points C1, which are the intersection of profile P with profile C.

The grooves 6, on opposite sides of the piston skirt, are closed off by the internal surface of the cylinder walls creating pockets of compressed lubricant as a result of the alternating movement of the pistons within and with respect to the cylinder.

The dimensions of each groove 6 have the following preferential values:

depth: 0.005–0.05 mm length: 5 mm angular section: 40°

On the basis of experimental studies, the improvement herein described creates a cushion of oil in the areas of greatest piston stress having the following features.

Each groove 6 is a pocket for the accumulation of lubricating oil, which is pressurized during piston movement in the cylinder providing adequate lubrication.

Constant lubrication is obtained in the areas under the greatest stress eliminating problems of micro-seizing, which frequently occurs in very high-speed engines.

There is a considerable reduction in sliding friction due to the presence of oil pockets and a reduced piston skirt surface area resulting from the presence of the two series of grooves 6.

There is a reduction in piston noise owing to the presence of a oil cushion.

Production costs for constructing pistons 1 having two opposite rows of grooves 6 are low as this process can be carried out during piston skirt construction.

Mechanical efficiency of engines equipped with said pistons is considerably improved.

The grooves can be constructed using numerically controlled machine tools at the same time as profile C and join the surface of the piston skirt. Said grooves can be created in an initial diamond cutting operation and shall have a longitudinal and angular profile C; a second operation completes groove construction in which the resulting grooves have a given depth and an angular section of approximately 40°. Said section has a non-oval angular profile or a profile which in any case is less than that of the piston skirt surface.

I claim:

1. An improved piston for alternative, endothermic four-cycle engines, comprising a piston head portion and a piston skirt portion located below said head portion, said piston skirt portion having opposite flattened faces aligned with a piston pin axis, said piston skirt comprising oil cushion lubrication pocket means for holding oil under pressure and comprising a series of elongated closed-end grooves on both sides of the piston skirt parallel to the piston pin axis and spaced 90° from said flattened portions and at approximately the height of the piston pin axis, said grooves on each side of said skirt being spaced one above another and parallel to one another and extending approximately 40° centered about a line perpendicular to the piston pin axis, each groove having a profile at its base less than the curvature of the piston skirt.

2. An improved piston as claimed in claim 1 in which the profile at the base of each groove is non-oval.

3. An improved piston as claimed in claim 1 having grooves (6) each with a profile at its base less than that of the piston skirt (c).

4. An improved piston as claimed in claim 1 in which [the opposite sides of each piston contain a series of grooves (6) parallel to the piston pin axis;] said grooves are closed off frontally by the internal cylinder wall [and are intended to contain oil under pressure].

5. A piston as claimed in claim 1 wherein said elongated closed-end grooves have as radial depth of 0.005–0.05 mm.

*6. An improved piston for alternative, endothermic four-cycle engines, comprising a piston head portion and a piston skirt portion located below said head portion, said piston skirt portion having opposite flattened faces aligned with a piston pin axis, said piston skirt comprising oil cushion lubrication pocket means for holding oil under pressure and comprising a series of elongated closed-end grooves on both sides of the piston skirt parallel to the piston pin axis and confined to locations spaced 90° from said flattened portions and at approximately the height of the piston pin axis, there being no grooves in said piston skirt other than those at said locations, said grooves on each side of said skirt being spaced one above another and parallel to one another and centered about a line perpendicular to the piston pin axis, each groove having a profile at its base less than the curvature of the piston skirt.*

*7. An improved piston as claimed in claim 6 in which the profile at the base of each groove is non-oval.*

*8. An improved piston as claimed in claim 6 in having grooves (6) each with a profile at its base less than that of the piston skirt (C).*

*9. An improved piston as claimed in claim 6 in which said grooves are closed off frontally by the internal cylinder wall.*

*10. A piston as claimed in claim 6 wherein said elongated closed-end grooves have a radial depth of 0.005–0.05. mm.*

*11. An improved piston for alternative, endothermic four-cycle engines, comprising a piston head portion and a piston skirt portion located below said head portion, said piston skirt portion having a first pair of opposing faces through which a piston pin axis passes, and a second pair of opposing faces, said piston skirt adapted to hold oil under pressure in a plurality of elongated closed-end grooves formed in each one of said second pair of opposing faces, substantially parallel to the piston pin axis and confined within said second pair of opposing faces, and at approximately the height of the piston pin axis, there being no grooves on said piston skirt between said second pair of opposing faces.*

*12. An improved piston as claimed in claim 11 in which the profile at the base of each groove is non-oval.*

*13. An improved piston as claimed in claim 11 having grooves (6) each with a profile at its base less than that of the piston skirt (C).*

*14. An improved piston as claimed in claim 11 in which said grooves are closed off frontally by the internal cylinder wall.*

*15. A piston as claimed in claim 11 wherein said elongated closed-end grooves have a radial depth of 0.005–0.05 mm.*

* * * * *